June 12, 1951 C. SHAW 2,556,227
ALL PURPOSE WHEEL ALIGNMENT MACHINE
Filed Nov. 17, 1947 3 Sheets-Sheet 1
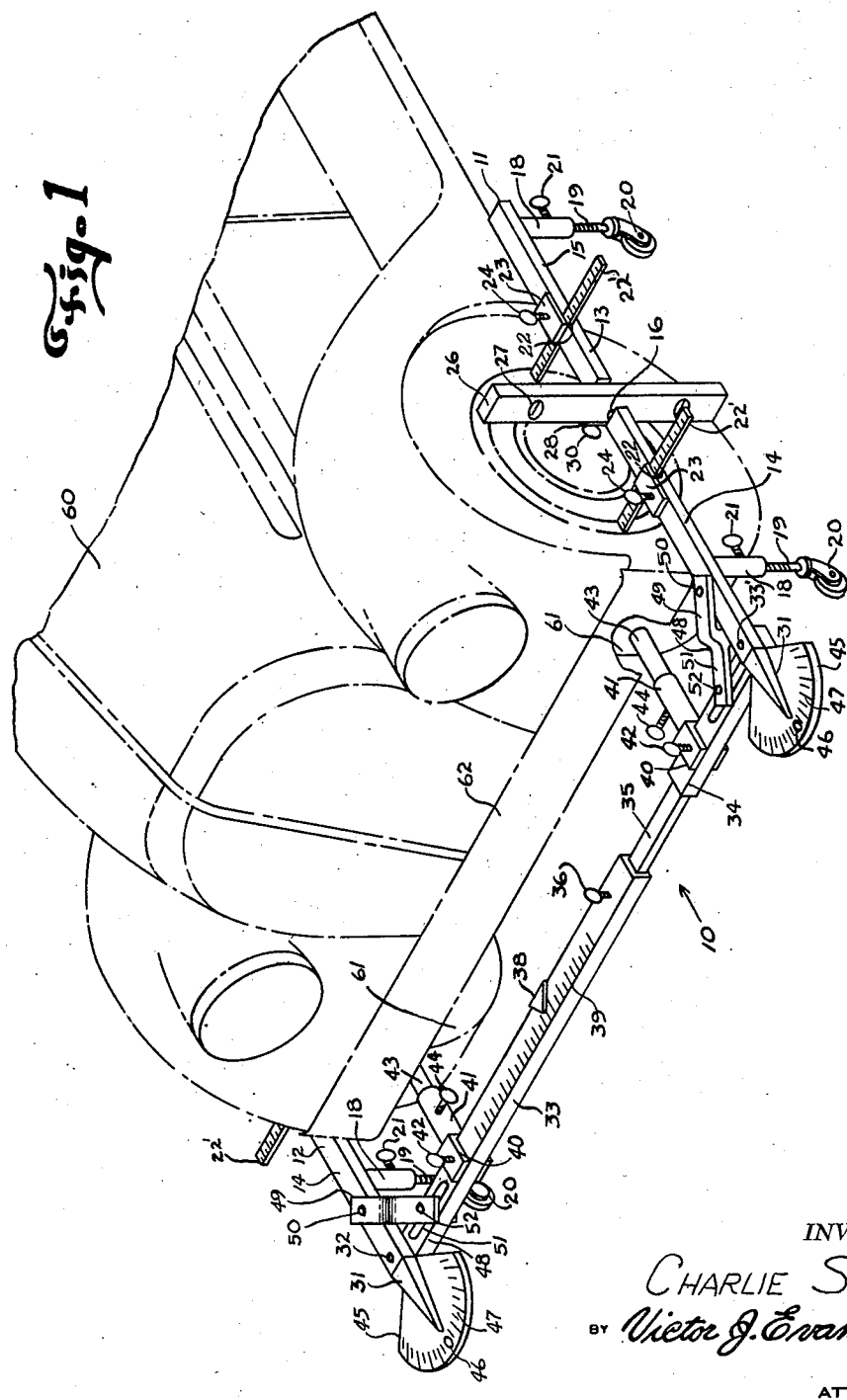
INVENTOR.
Charlie Shaw
BY Victor J. Evans & Co.
ATTORNEYS June 12, 1951 C. SHAW 2,556,227
ALL PURPOSE WHEEL ALIGNMENT MACHINE
Filed Nov. 17, 1947 3 Sheets-Sheet 2
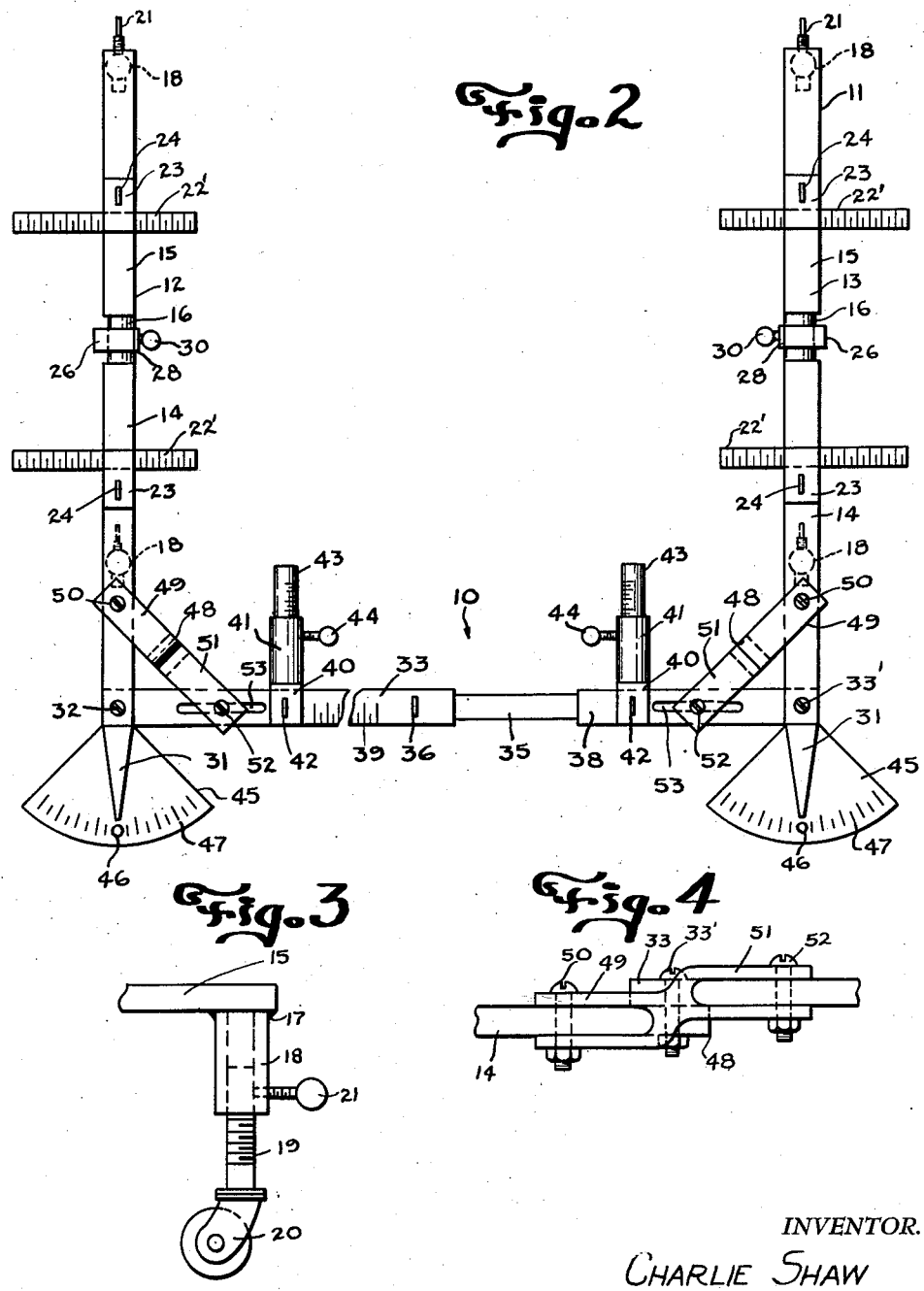
INVENTOR.
CHARLIE SHAW
BY Victor J. Evans & Co.
ATTORNEYS June 12, 1951 — C. SHAW — 2,556,227
ALL PURPOSE WHEEL ALIGNMENT MACHINE
Filed Nov. 17, 1947 — 3 Sheets-Sheet 3
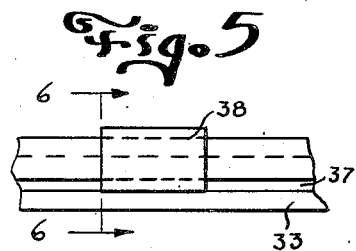
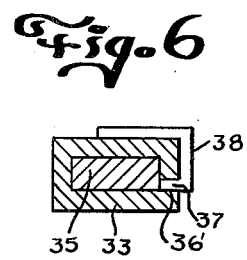
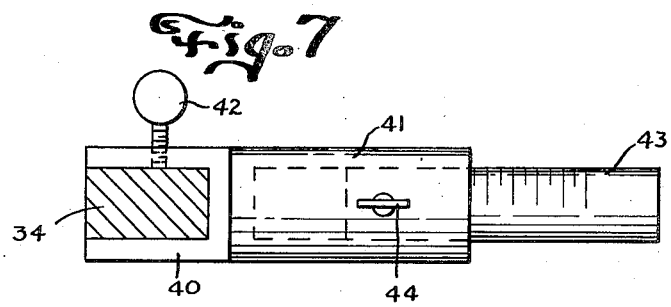
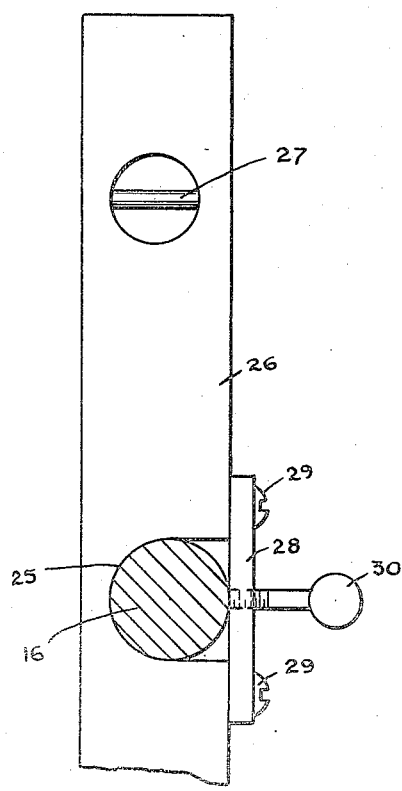
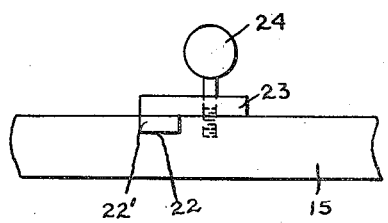
INVENTOR.
CHARLIE SHAW
BY Victor J. Evans & Co.
ATTORNEYS Patented June 12, 1951

2,556,227

UNITED STATES PATENT OFFICE 2,556,227

ALL-PURPOSE WHEEL ALIGNMENT MACHINE

Charlie Shaw, Panama City, Fla.

Application November 17, 1947, Serial No. 786,340

3 Claims. (Cl. 33—203.17)

1

This invention relates to wheel alinement machines, which are particularly adapted to be used for alining the front wheels of automobiles.

Among the many objects of the invention are to provide a machine of this character that is light in weight, quickly and easily adjusted, can be quickly and easily assembled or disassembled, the front wheels of the automobile can be quickly checked without changing the position of the machine, is inexpensive to manufacture and is accurate in its adjustment.

All adjustments of the machine can be made from the outside of the wheels of the automobile. Thus the operator of the machine can keep a close check on the wheels while the wheels are being moved inwardly or outwardly to check their caster and camber.

With the above and other objects and advantages in view, the invention consists of the novel details of construction, arrangement and combination of parts more fully hereinafter described, claimed and illustrated in the accompanying drawings in which:

Figure 1 is a perspective view of the machine embodying the invention in position to check the alinement of the front wheels of a motor vehicle;

Figure 2 is a plan view of the machine, per se;

Figure 3 is a detailed fragmentary view of one of the caster wheels and its mounting;

Figure 4 is a detailed fragmentary view of the double clevis used at each corner of the machine;

Figure 5 is a detailed fragmentary view of the indicator for the adjustable measuring bar;

Figure 6 is a sectional view on the line 6—6 of Figure 5;

Figure 7 is a detailed view partly in section of one of the square adjusting gauges;

Figure 8 is a detailed fragmentary view of one of the gauge clamps and

Figure 9 is a detailed fragmentary view partly in section of one of the levels for the machine.

Referring more in detail to the drawings, the reference numeral 10 designates the machine embodying the invention.

The machine 10 comprises a skeleton U-shaped framework 11, having composite side members 12 and 13 respectively. Each side member is composed of two bar members 14 and 15 respectively, which are joined at their inner ends by the short bar member 16. Secured to the outer end of each member 15 of the side members 12 and 13 by welding as indicated by the numeral 17 is a socket 18. Each socket has a threaded bore to adjustably engage the threaded stem 19 of the caster

2 wheel 20. A set screw 21 carried by each socket will, when tightened, retain the stem 19 of the caster wheel 20 in adjusted relation to the socket 18. Intermediate of the inner and outer ends of each member 15, there is provided a seat 22 in which is slidably mounted the straight edge or gauge 22'. The member 22' is fixed in its respective seat 22 by a plate 23 overlying the member 22' and retained in place on each member 15 by a set screw 24. Mounted on each member 16, by means of the open face curved seat 25, centrally thereof, is a level 26. Each level is provided with a bubble 27 in the usual manner, at both the upper and lower ends thereof. A plate 28 secured over the open face of the seat 25 by fasteners 29 carries a set screw 30 which, when tightened, will retain the level 26 in any set position on the member 16.

A similar seat 22 is provided in each member 14 of the side members 12 and 13, forwardly of the member 16. This seat carries the gauge 22' which is fixed in its seat by the overlying plate 23 carrying the set screw 24, all as previously described.

Forwardly of the member 22' in each member 14, each member 14 has a socket 18 secured thereto by welding. Each socket has a threaded bore to receive the threaded stem 19 of the caster wheel 20, and a set screw 21 in the socket fixes the stem 19 in the socket, all as previously described.

Thus by means of the four point support provided by the caster wheels, the frame is retained in an elevated position above the ground surface level. The wheels provide means whereby the frame may be moved over the ground surface during the alining of the front wheels of an automobile.

Fixed to the forward end of each member 14 is the pointer 31. Rearwardly of this pointer, the member 14 of the side member 12 is pivoted at 32 to the elongated hollow member 33. The member 14 of the side member 13 is pivoted at 33' rearwardly of the pointer 31 to a foreshortened hollow member 34. Fixed to and within the member 34 is the bar 35 which, at the other end, is slidably mounted within the member 33. A set screw 36 carried by the member 33 engages the member 35 to fix it within the member 33.

The member 33, at the rear edge thereof, is provided with a slot 36' which extends for practically the entire length of this member. The slot 36' receives the tongue 37 formed on the rear edge of the member 35, to which is fixed the L-shaped pointer 38, which, overlying the upper side of the member 33, cooperates with the graduations 39 on the member 33 for the adjustment of the overall length of the members 33, 34 and 35.

Mounted on each of the members 33 and 34 by means of a U-shaped bracket 40, is a socket 41. A set screw 42 in each bracket fixes the bracket to each member as desired. Slidably mounted in each socket is the short gauge rod 43 and a set screw 44 in each socket will fix the rod in the socket as desired.

Fixed to each outer end of the members 33 and 34, is a sector shaped plate 45. Each plate has a central zero marking 46, and graduations 47, which extend in an arc on both sides of the zero marking. These plates underlie the pointers 31 so that the pointers coincide with the graduations 47 on each plate.

Joining the members 33 and 34 to the members 14 of the side members 12 and 13 respectively, are the double clevis members 48. The stirrup 49 of this member is pivoted at 50 to each member 14. The stirrup 51 of the member 48 is connected to each member 33 and 34 by a pivot 52, each of which is received in its respective elongated slot 53 in its respective member.

In operation, the frame 11 is set so that the pointers 31 each coincide with the zero markings on the plates 45. The side members 12 and 13 are then at a perfect right angle to the member to which they are connected, and a perfect square is formed. The frame is then rolled toward the automobile 60 until the members 43 each contact a front wheel 61 of the automobile. The members 43 are each adjusted until both are of the same length. Thus the members 33, 34 and 35 are equally spaced from each wheel. The gauges 22' are then moved inwardly to engage the side wall of each tire on each front wheel or they may contact the rim flange of the wheel. If all contacts cannot be made, due to the height of the bumper 62 of the automobile, the stems of the caster wheels are adjusted until the bumper is cleared. Sliding of the bar 35 within the member 33 permits the members 43 to engage the wheels if they are too far apart or too close together. After all contacts are made, and the members 33 and 35 are adjusted, tightening of their respective set screws will retain all adjustments.

Since excessive caster of the wheels will affect the toe-in of the wheels the gauges 22' will indicate whether there is incorrect toe-in or not. If the measurements on the gauges is incorrect the caster of the wheels can be adjusted through the king or knuckle pins. If the toe-in is not then corrected further correction of the toe-in can be accomplished by the tie rods until the gauges 22' correctly check the toe-in of the wheels. The camber of the wheels is checked through the level mounted on the side members. A rule engaging the level when in perfect vertical relation to the ground and the wheel will indicate the angle of camber and the necessary adjustment necessary to obtain the correct angle of camber.

The use of this machine eliminates the expensive equipment in use at the present time, and when used, will accurately and quickly check the alinement of the front wheels while the automobile is parked on any level ground surface.

It is believed that from the foregoing description, the operation and construction of the machine will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A portable alinement machine for the front wheels of automobiles, comprising a U-shaped frame, casters secured to said frame for the supporting thereof, said frame comprising side members and an adjustable front or base member, means on said side members cooperating with means on said front member for placing the side members at perfect right angles to said front member, means on said front member to adjust the relationship of said front member to said wheels, means engaging said side members and said front member for retaining said side members in true right angle relation to said front member and means carried by said side members for checking the camber and toe-in of the front wheels of the automobile.

2. The invention as in claim 1, wherein the front member comprises telescopically arranged portions and means are provided on said front member for checking the longitudinal adjustment of said telescopically arranged portions.

3. The invention as in claim 1 wherein the means for checking the toe-in of the front wheels comprises gauges slidably mounted in said side members.

CHARLIE SHAW.

REFERENCES CITED

The following references are of record in the file of this patent:

UNITED STATES PATENTS

| Number | Name | Date |
|---|---|---|
| 1,449,289 | King | Mar. 20, 1923 |
| 1,782,827 | Lahr | Nov. 25, 1930 |
| 2,036,895 | Tharp | Apr. 7, 1936 |
| 2,045,108 | Smith | June 23, 1936 |
| 2,160,226 | Phillips | May 30, 1939 |
| 2,401,715 | Wilkerson | June 4, 1946 |

FOREIGN PATENTS

| Number | Country | Date |
|---|---|---|
| 21,571 | Australia | 1935 |
| 504,756 | Great Britain | May 1, 1939 |